United States Patent
Watanabe et al.

(10) Patent No.: US 6,637,226 B2
(45) Date of Patent: Oct. 28, 2003

(54) CONSTANT-TEMPERATURE LIQUID CIRCULATING APPARATUS

(75) Inventors: Mitsuhiro Watanabe, Ibaraki (JP); Yoshiaki Sueoka, Ibaraki (JP)

(73) Assignee: SMC Corporation, Tokyo (JP)

( * ) Notice: Subject to any disclaimer, the term of this patent is extended or adjusted under 35 U.S.C. 154(b) by 0 days.

(21) Appl. No.: 10/187,370

(22) Filed: Jul. 2, 2002

(65) Prior Publication Data

US 2003/0014988 A1 Jan. 23, 2003

(30) Foreign Application Priority Data

Jul. 16, 2001 (JP) ........................................ 2001-215748

(51) Int. Cl.⁷ ............................. F25D 17/02; F25B 1/00
(52) U.S. Cl. ...................... 62/201; 62/228.4; 62/196.4
(58) Field of Search ............................. 62/228.4, 196.4, 62/175, 201, 228.3, 185, 430, 99, 396

(56) References Cited

U.S. PATENT DOCUMENTS

| 4,769,998 A | * | 9/1988 | Oswalt et al. ................. 62/98 |
| 4,850,201 A | * | 7/1989 | Oswalt et al. ................ 62/185 |
| 4,949,552 A | * | 8/1990 | Adams ....................... 62/196.4 |
| 6,003,595 A | * | 12/1999 | Watanabe .................... 165/299 |
| 6,233,955 B1 | * | 5/2001 | Egara ........................ 62/196.4 |
| 6,393,850 B1 | * | 5/2002 | Vanderstraeten ........... 62/196.3 |
| 6,467,292 B1 | * | 10/2002 | Praxmarer et al. ......... 62/228.4 |
| 2001/0003347 A1 | * | 6/2001 | Shimoda et al. .............. 236/13 |
| 2002/0174665 A1 | * | 11/2002 | Pritchard et al. .............. 62/93 |

* cited by examiner

Primary Examiner—Marc Norman
(74) Attorney, Agent, or Firm—Oblon, Spivak, McClelland, Maier & Neustadt, P.C.

(57) ABSTRACT

A constant-temperature liquid circulating apparatus including a constant-temperature liquid circuit section, a refrigerating circuit section and a control section in which the refrigerating circuit section includes a main circuit section having a compressor whose revolution speed is controlled by an inverter power source. The main circuit section has a condenser, an electronic expansion valve and an evaporator, and the refrigerating circuit section also includes a hot gas circuit section which bypasses the condenser and which has an electronic expansion valve. The constant-temperature circuit section includes a heat exchanger, a temperature sensor and a circulating unit; and the control section controls the opening degree of the electronic expansion valve, and the revolution speed of the compressor according to a signal from the temperature sensor, thereby controlling the temperature of constant-temperature liquid supplied to a load to a predetermined temperature.

3 Claims, 4 Drawing Sheets

CONSTANT-TEMPERATURE LIQUID CIRCULATING APPARATUS

FIELD OF THE INVENTION

The present invention relates to a constant-temperature liquid circulating apparatus which supplies constant-temperature liquid to a load to circulate the same.

PRIOR ART

FIG. 3 shows one example of a constant-temperature liquid circulating apparatus which has been already proposed, and a constant-temperature liquid circulating apparatus 101 comprises a refrigerating circuit section 103 for cooling constant-temperature liquid whose temperature has been elevated in a load 2, a constant-temperature liquid circuit section 104 which, after adjusting the temperature of the constant-temperature liquid which has been cooled by refrigerant of the refrigerating circuit section 103 to a predetermined temperature, supplies the adjusted constant-temperature liquid circuit section 104 to the load 2 to circulate the same, and a control section 105 which controls the temperature of the constant-temperature liquid supplied to the load 2.

The refrigerating circuit section 3 is constituted by connecting a compressor 7 which compresses proper refrigerant to produce refrigerant gas with a high temperature and a high pressure, a condenser 8 which cools and condenses the refrigerant gas to produce liquid refrigerant with a high pressure, a decompressor 9 which decompresses liquid refrigerant to temperature-reduce the same, and an evaporator 10 which evaporates the liquid refrigerant which has been pressure-reduced in the decompressor 9 in this order in series.

The constant-temperature liquid circuit section 104 comprises a tank 24 for constant-temperature liquid, a heat exchanger 25 which cools the constant-temperature liquid whose temperature has been elevated in the load 2, a heater unit 26 which has a heater 27 heating the constant-temperature liquid which has been cooled in the heat exchanger 25 up to a predetermined temperature, a pump 28 which supplies the constant-temperature liquid in the tank 24 whose temperature has been adjusted to the predetermined temperature by the heater 27 to the load 2 to circulate the same and a level switch 29 which detects a liquid level of the constant-temperature liquid in the tank 24; and all of the heat exchanger 25, the heater unit 26 and the pump 28 are assembled to the tank 24. Also, a cylindrical heater cover 30 with a bottom which surrounds the heater 27 and whose upper portion can be opened is provided around an outer periphery of the heater 27.

The control section 105 is for controlling the entire apparatus, and it comprises a temperature controller 42 which outputs a necessary signal according to a temperature signal of a temperature sensor 37, a programmable controller (hereinafter, abbreviated as PLC) 43 which outputs a necessary signal according to signals of the level switch 29 in the tank 24, a low pressure cut switch 39 and a refrigerant high pressure cut switch 20, an electromagnetic contactor/electromagnetic switch 44 which controls operations of the compressor 7 and the pump 28, current flow to the heater 27 and an injection valve 16 according to signals output from the temperature controller 42 and the PLC 43, and an operation displaying panel 45 which performs necessary displaying.

Since the constant-temperature liquid circulating apparatus 101 cools constant-temperature liquid whose temperature has been elevated in the load 2 by the heat exchanger 25 and heats the cooled constant-temperature liquid by the heater 27 to produce a constant-temperature liquid with a predetermined temperature, it is made easy to conduct a temperature adjustment of the constant-temperature liquid.

However, since the constant-temperature liquid circulating apparatus 101 heats the constant-temperature liquid which has been cooled in the heat exchanger 25 by the heater 27, the amount of power required for an operation is increased. In particular, according to the operation condition of the circulating apparatus 101, such a phenomenon that the compressor 7, the pump 28 and the heater 27 are made conductive simultaneously occurs, and it is necessary to increase the allowance amount of current conduction to the circulating apparatus 101 in order to respond to this phenomenon, and an equipment cost for current conduction is also increased.

As an apparatus which has solved such a problem, there is a constant-temperature liquid circulating apparatus shown in FIG. 4.

A constant-temperature liquid circulating apparatus 91 shown in FIG. 4 comprises a constant-temperature liquid circuit section 93 which cools constant-temperature liquid-circulating from a load 2 to a predetermined temperature to supply the same to the load 2, a refrigerating circuit section 92 for cooling the constant-temperature liquid, and a control section 94 for controlling the temperature of the constant-temperature liquid supplied to the load 2.

The refrigerating circuit section 92 comprises a main circuit section 50 provided with a compressor 7, a condenser 8, a first electronic expansion valve 56, an evaporator 10 and a piping connecting theses members in series; a pressure sensor 61 and a temperature sensor 62 provided in the main circuit section 50; a hot gas circuit section 58 provided with a second electronic expansion valve 59 which supplies a portion of refrigerant with a high temperature bypassing the condenser 8 and the first electronic expansion valve 56 to be discharged from the compressor 7 to the evaporator 10; and a circulating circuit 12 provided with an electronic expansion valve 57.

The constant-temperature liquid circuit section 93 comprises a tank 24 for constant-temperature liquid, an overflow tank 64 in the tank 24, a heat exchanger 25 which cools constant-temperature liquid circulated from the load 2 in the evaporator 10, a temperature sensor 37 which detects the temperature of constant-temperature liquid, a level switch 29, and a pump 28 which supplies constant-temperature liquid whose temperature has been adjusted to a predetermined temperature to the load 2 to circulate the same.

The control section 94 comprises a PLC 43, an electromagnetic contactor/electromagnetic switch 67, an operation display panel 45, and an expansion valve controller 96, and the expansion valve controller 96 controls the opening degrees of the electronic expansion valves 56, 57 and 59 individually to adjust constant-temperature liquid to a predetermined temperature by the signals from the temperature sensor 37, 62 and the pressure sensor 61.

Then, in the constant-temperature liquid circulating apparatus 91 shown in FIG. 4, since the opening degrees of the first and second electronic expansion valves 56, 59 are controlled by the control section 94 to control the refrigerating capacity of the refrigerating circuit section 92 so that the temperature of the constant-temperature liquid supplied to the load 2 can be controlled accurately, the heater 27 for preparing constant-temperature liquid with a predetermined temperature, which is provided in the constant-temperature liquid circulating apparatus 1 shown in FIG. 3 is made unnecessary.

However, since the constant-temperature liquid circulating apparatus 91 shown in FIG. 4 controls the refrigerating capacity of the refrigerating circuit section 92 by only controlling the opening degrees of the first and second electronic expansion valves 56, 59, a time required for reaching a target temperature is short, but it may not be said that controllability to disturbances (change in flow rate of constant-temperature liquid, change in external thermal load, change in temperature of cooling water in the condenser and the like) is good.

DISCLOSURE OF THE INVENTION

A ploblem to be solved by the invention is to provide a constant-temperature liquid circulating apparatus which is of an energy saving type, whose time required for reaching a target temperature is short, whose controllability to disturbance is excellent and whose size can be reduced.

In order to solve the above problem, a constant-temperature liquid circulating apparatus according to the present invention is a constant-temperature liquid circulating apparatus comprising a constant-temperature liquid circuit section which cooling or heating a constant-temperature liquid returned back from a load to a predetermined temperature to supply the same to the load, a refrigerating circuit section for cooling or heating the constant-temperature liquid, and a control section, wherein the refrigerating circuit section comprises a main circuit section which is provided with a compressor whose revolution speed is controlled by an inverter power source, a condenser, a first electronic expansion valve, an evaporator and piping connecting the compressor, the condenser, the first electronic expansion valve and the evaporator in series, and a hot gas circuit portion which has a second electronic expansion valve which bypasses the condenser and the first electronic expansion valve to supply a portion of refrigerant with a high temperature discharged from the compressor to the evaporator; the constant-temperature liquid circuit section comprises a tank for constant-temperature liquid, a heat exchanger which cools or heats the constant-temperature liquid circulating from the load in the evaporator, at least one temperature sensor which detects the temperature of a constant-temperature liquid, and circulating means which supplies a constant-temperature liquid whose temperature has been adjusted to a predetermined temperature to the load to circulate the same; and the control section controls the opening degrees of the first and second electronic expansion valves and the revolution speed of the compressor according to a signal from the temperature sensor to control the temperature of the constant-temperature liquid supplied to the load.

In the constant-temperature liquid circulating apparatus, it is suitable that the refrigerating circuit section has at least one temperature sensor or pressure sensor which detects the temperature or pressure of the refrigerant; and the control section controls the opening degree of the first electronic expansion valve according to a signal from the temperature sensor or pressure sensor in the refrigerating circuit section instead of the signal from the constant-temperature liquid temperature sensor or together with the signal from the constant-temperature liquid temperature sensor, and it is preferable that the temperature sensors or the pressure sensors in the refrigerating circuit section are respectively provided at an inflow side and an outflow side of the evaporator of the main circuit portion; and the control section controls the opening degree of the first electronic expansion valve according to a deviation signal based upon a signal from the temperature sensors or pressure sensors provided at the inflow side and the outflow side of the evaporator and controls the opening degree of the second electronic expansion valve according to a signal from the constant-temperature liquid temperature sensor.

A constant-temperature liquid circulating apparatus according to the present invention is a constant-temperature liquid circulating apparatus comprising a constant-temperature liquid circuit section which cooling or heating a constant-temperature liquid returned back from a load to a predetermined temperature to supply the same to the load, a refrigerating circuit section for cooling or heating the constant-temperature liquid, and a control section, wherein the refrigerating circuit section comprises a main circuit section which is provided with a compressor whose revolution speed is controlled by an inverter power source, a condenser, a first electronic expansion valve, an evaporator and piping connecting the compressor, the condenser, the first electronic expansion valve and the evaporator in series, and a hot gas circuit portion which has a second electronic expansion valve which bypasses the condenser and the first electronic expansion valve to supply a portion of refrigerant with a high temperature discharged from the compressor to the evaporator; the constant-temperature liquid circuit section comprises a tank for constant-temperature liquid, a heat exchanger which cools or heats the constant-temperature liquid returned back from the load in the evaporator, at least one temperature sensor which detects the temperature of a constant-temperature liquid, and circulating means which supplies a constant-temperature liquid whose temperature has been adjusted to a predetermined temperature to the load to circulate the same; and the control section controls the opening degrees of the first and second electronic expansion valves and the revolution speed of the compressor according to a signal from the temperature sensor to control the temperature of the constant-temperature liquid supplied to the load to a predetermined temperature, so that the refrigerating capacity of the refrigerating circuit section is controlled by controlling the revolution speed of the compressor in addition to controlling effected by the first and second electronic expansion valves.

That is, since the control section controls the revolution speed of the compressor to control the temperature or the pressure of hot gas by controlling the frequency of an inverter power source of the compressor and the hot gas is supplied to the evaporator while the hot gas is associated with the control of the first and second expansion valves, the refrigerating capacity of the refrigerating circuit section can be controlled.

Accordingly, since the constant-temperature liquid circulating apparatus according to the present invention controls the refrigerating capacity of the refrigerating circuit section not only by controlling effected by the first and second electronic expansion valves but also by controlling the revolution speed of the compressor, the constant-temperature liquid supplied to the load can accurately be controlled to a predetermined temperature and a time required for reaching the target temperature is considerably made fast, and controllability to disturbance is excellent.

Also, since, even if a small-sized compressor is used, the compressor can achieve the same refrigerant circulating amount as that of the conventional apparatus by operating the compressor at a high frequency, the apparatus can be small-sized, and since the revolution speed can be reduced by operating the compressor at a low frequency when the refrigerant circulating amount may be small, noises generated by the compressor can be suppressed and consumption power can be reduced.

Also, the constant-temperature liquid circulating apparatus according to the present invention does not require a heater for heating constant-temperature liquid, because the temperature of constant-temperature liquid to be supplied to a load can be controlled to a predetermined temperature accurately.

Accordingly, the constant-temperature liquid circulating apparatus according to the present invention can achieve energy saving and can be manufactured to a small-sized one.

DETAILED DESCRIPTION

Figure 1:
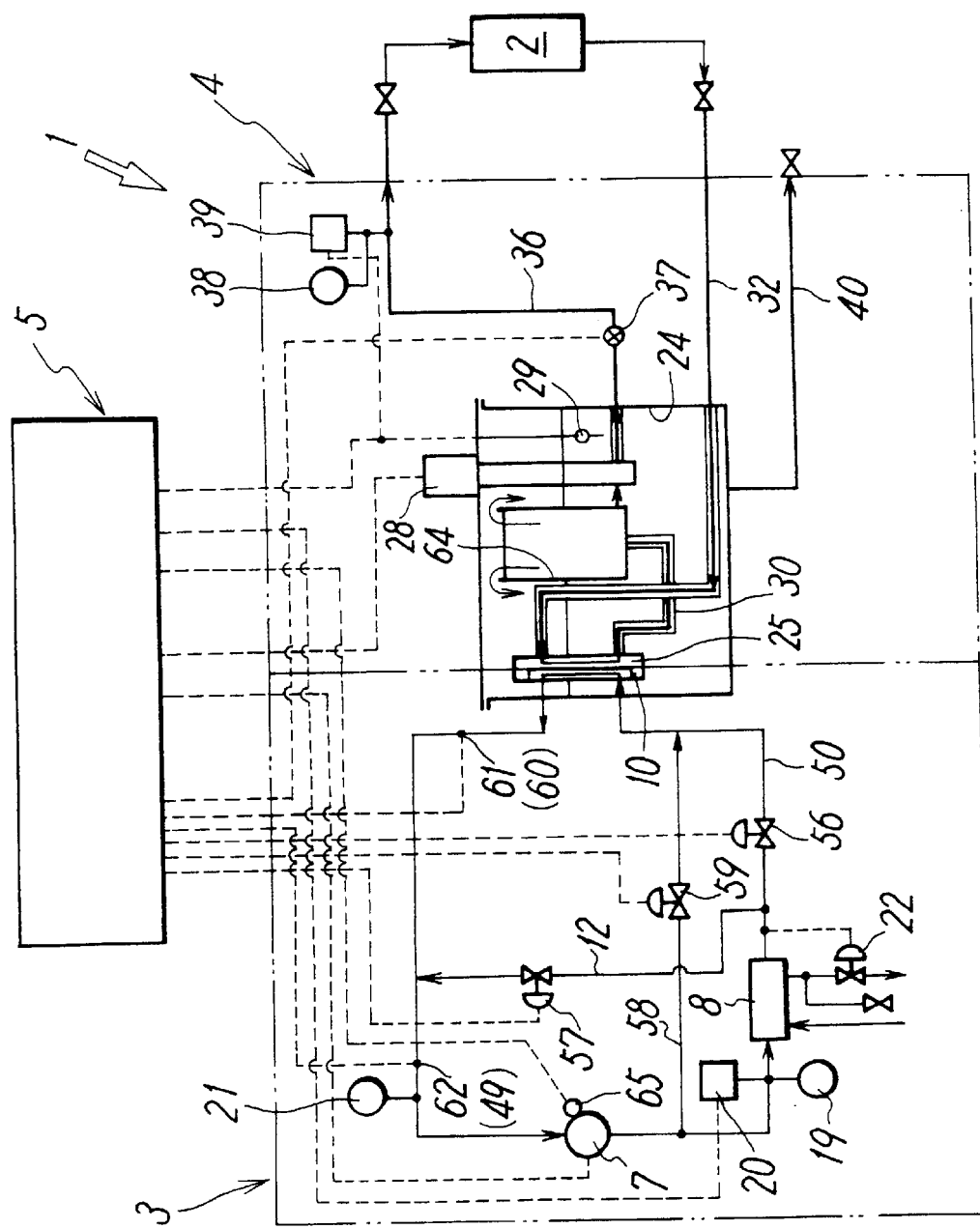
FIG. 1 is a configuration diagram showing an embodiment of a constant-temperature liquid circulating apparatus according to the present invention.

FIG. 1 shows one embodiment of a constant-temperature liquid circulating apparatus according to the present invention, and the constant-temperature liquid circulating apparatus 1 comprises a constant-temperature circuit section 4 which cools or heats constant-temperature liquid returned back from a load 2 to a predetermined temperature to supply the same to the load, a refrigerating circuit section 3 for cooling or heating the constant-temperature liquid and a control section 5 for controlling the temperature of the constant-temperature liquid supplied to the load 2.

The refrigerating circuit section 3 is provided with a main circuit section 50 comprising a compressor 7 whose revolution speed is controlled by an inverter power source which compresses suitable refrigerant to produce refrigerant gas with a high temperature and a high pressure, a condenser (water cooling type condenser in the illustrated example) 8 which cools and condenses the refrigerant gas to produce liquid refrigerant with a high pressure, a decompressor which decompresses the liquid refrigerant to produce refrigerant with a low temperature and a low pressure and which comprises an electronic expansion valve 56 whose valve opening degree is adjustable, an evaporator 10 which evaporates refrigerant with a low temperature and a low pressure which has been decompressed by the electronic expansion valve 56 and a piping connecting these members; and a hot gas circuit section 58 having an electronic expansion valve 59 whose valve opening degree is adjustable and which bypasses the condenser 8 and the electronic expansion valve 56 to supply a portion of a refrigerant with a high temperature discharged from the compressor 7 to the evaporator 10.

Also, the refrigerating circuit section 3 is provided with a circulating circuit 12 which, when an outlet temperature of the evaporator 10 is high, circulates refrigerant which has been condensed in the condenser 8 from a flow path between the condenser 8 and the electronic expansion valve 56 to an inlet side of the compressor 7, an expansion valve (an electronic expansion valve in the illustrated example) 57 which can adjust a circulation amount of refrigerant in the circulating circuit 12. Then, all of these electronic expansion valve 56, 57 and 59 are controlled by the control section 5.

Also, provided in a flow path of a crossing section between the outlet side of the evaporator 10 and the circulating circuit 12 is a pressure sensor 61 which detects the pressure of the refrigerant gas flowing in this flow path, and provided in a flow path between the crossing section and the inlet side of the compressor 7 is a temperature sensor 62 which detects the temperature of the refrigerant gas circulated to the compressor 7 to output a signal.

Then, the pressure sensor 61 and the temperature sensor 62 are constituted so as to output a signal to the control section 5.

Also, the compressor 7 is provided with a revolution speed detector 65 which detects the revolution speed thereof to output a signal, and a signal from the revolution speed detector 65 is output to the control section 5.

Incidentally, instead of the pressure sensor 61 and the temperature sensor 62, a temperature sensor 60 and a pressure 49 can be used.

In the refrigerating circuit section 3, a high pressure refrigerant pressure gauge 19 which detects the pressure of the refrigerant gas with a high temperature and a high pressure and a high pressure refrigerant cut switch 20 which, when the pressure of the pressure gauge increases to a predetermined pressure or more, outputs a signal are provided in a flow path between the compressor 7 and the condenser 8, a low pressure refrigerant pressure gauge 21 which detects the pressure of refrigerant gas with a low pressure is provided on an inlet (circulation flow side) of the refrigerant gas in the compressor 7. Also, a pressure control water valve 22 which adjusts a flow rate of cooling water supplied is provided in the condenser 8.

The constant-temperature liquid circuit section 4 comprises a tank 24 for constant-temperature liquid, a heat exchanger 25 which cools or heats constant-temperature liquid returned from the load 2 in the evaporator 10, a temperature sensor 37 which detects the temperature of constant-temperature liquid, and a pump 28 which supplies the constant-temperature liquid cooled to the predetermined temperature to the load 2 to circulate the same.

Also, the constant-temperature liquid circuit section 4 is provided with a level switch 29 which detect the water level of the constant-temperature liquid in the tank 24 and an overflow tank 64 in the tank 24, and the heat exchanger 25 in which the evaporator 10 of the refrigerating circuit section 3 is incorporated is connected at its inlet with a return pipe 32 for a constant-temperature liquid returned from the load 2 and at its outlet with a pipe 30 communicating with a lower portion of the overflow tank 64, respectively.

The temperature sensor 37 is provided in a supply pipe 36 connected to an discharge port of the pump 28, and a pressure gauge 38 which detects the pressure on the outlet side of constant-temperature liquid and a low pressure cut switch 39 which, when the pressure detected by the pressure gauge 38 becomes a predetermined pressure or less, outputs a signal are provided downstream of the temperature sensor.

Also, a drain pipe 40 for discharging the constant-temperature liquid in the tank 24 is provided in a bottom wall of the tank 24.

The control section 5 processes input signals sent from the temperature sensors 37, 62, the pressure sensor 61 and the revolution speed detector 65 to control the opening degrees of the electronic expansion valves 56, 57 and 59 individually, and controls the revolution speed of the compressor 7 while being associated with controls of the electronic expansion valves 56, 57 and 59.

Though control section 5 controls the opening degrees of the electronic expansion valves 56, 57 and 59 individually according to a signal from the temperature sensor 37 which detects the temperature of constant-temperature liquid, it may control the opening degrees of the electronic expansion valves 56, 57 and 59 individually according to a signal from the temperature sensor 62 (or the pressure sensor 49) or the pressure sensor 61 (or the temperature sensor 60) which detects the temperature and the pressure of the refrigerant gas individually instead of a signal from the temperature sensor 37 or together with a signal from the temperature sensor 37.

Since the compressor 7 is a compressor whose revolution speed is controlled by an inverter power source, the revolution speed of the compressor 7 which compresses refrigerant gas can be controlled accurately by changing the frequency of the inverter power source, so that the temperature and the pressure of the refrigerant gas compressed by the compressor 7 are increased when the revolution speed of the compressor 7 increases and they are decreased when the revolution speed of the compressor 7 decreases.

Then, the control section 5 processes input signals from the temperature sensors 37, 60 and 62, the pressure sensor 61 and the revolution speed detector 65 to control the opening degrees of the electronic expansion valves 56, 57 and 59 individually and control the revolution speed of the compressor 7 and supplies hot gas generated in the compressor 7 to the evaporator 10 while being associated with controls of the electronic expansion valves 56, 57 and 59, thereby allowing control of a refrigerating capacity of the refrigerating circuit section 3.

Accordingly, since the constant-temperature liquid circulating apparatus 1 of the present invention controls the refrigerating capacity of the refrigerating circuit section 3 not only by controling effected by the electronic expansion valves 56 and 59 but also by controlling the revolution speed of the compressor 7, the temperature of the constant-temperature liquid supplied to the load 2 can be controlled to the predetermined temperature accurately, and a time required for reaching a target temperature is remarkably made short and an excellent controllability to disturbance can be achieved.

Also, in the constant-temperature liquid circulating apparatus 1, since, even when a small-sized compressor is used, the circulation amount of refrigerant can be made equal to that in the conventional apparatus by operating the compressor 7 with a high frequency, the apparatus can be small-sized, and since, when the circulation amount of refrigerant is little, the revolution speed can be reduced by operating the compressor with a low frequency, noises of the compressor can be suppressed, power consumption can be reduced, and the constant-temperature liquid supplied to the load can be controlled to the predetermined temperature, so that a heater for heating constant-temperature liquid is not required.

Accordingly, the constant-temperature liquid circulating apparatus 1 can achieve energy saving and the apparatus can be small-sized.

Also, the control section 5 is provided therein with a PLC (not shown), an operation display panel (not shown), and an electromagnetic contactor/electromagnetic switch (not shown), and when a signal from the level switch 29, the low pressure cut switch 39 or the refrigerant high pressure cut switch 20 is inputted into the control section 5, the PLC outputs a signal to the electromagnetic contactor/electromagnetic switch and the electromagnetic contactor/electromagnetic switch controls operations of the compressor 7 and the pump 28 by the signal.

Figure 2:
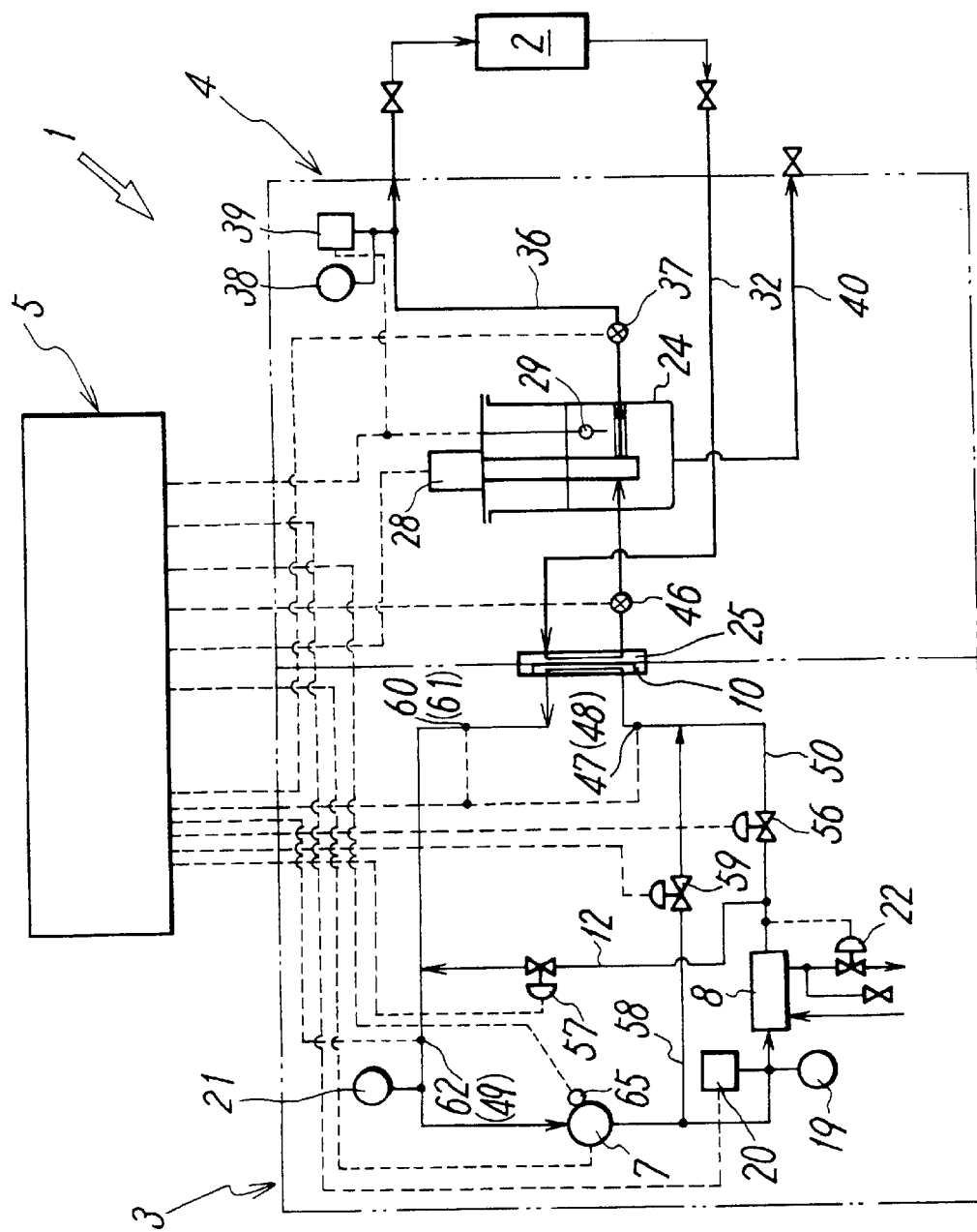
FIG. 2 is a configuration diagram showing another embodiment of a constant-temperature liquid circulating apparatus according to the present invention.
Figure 3:
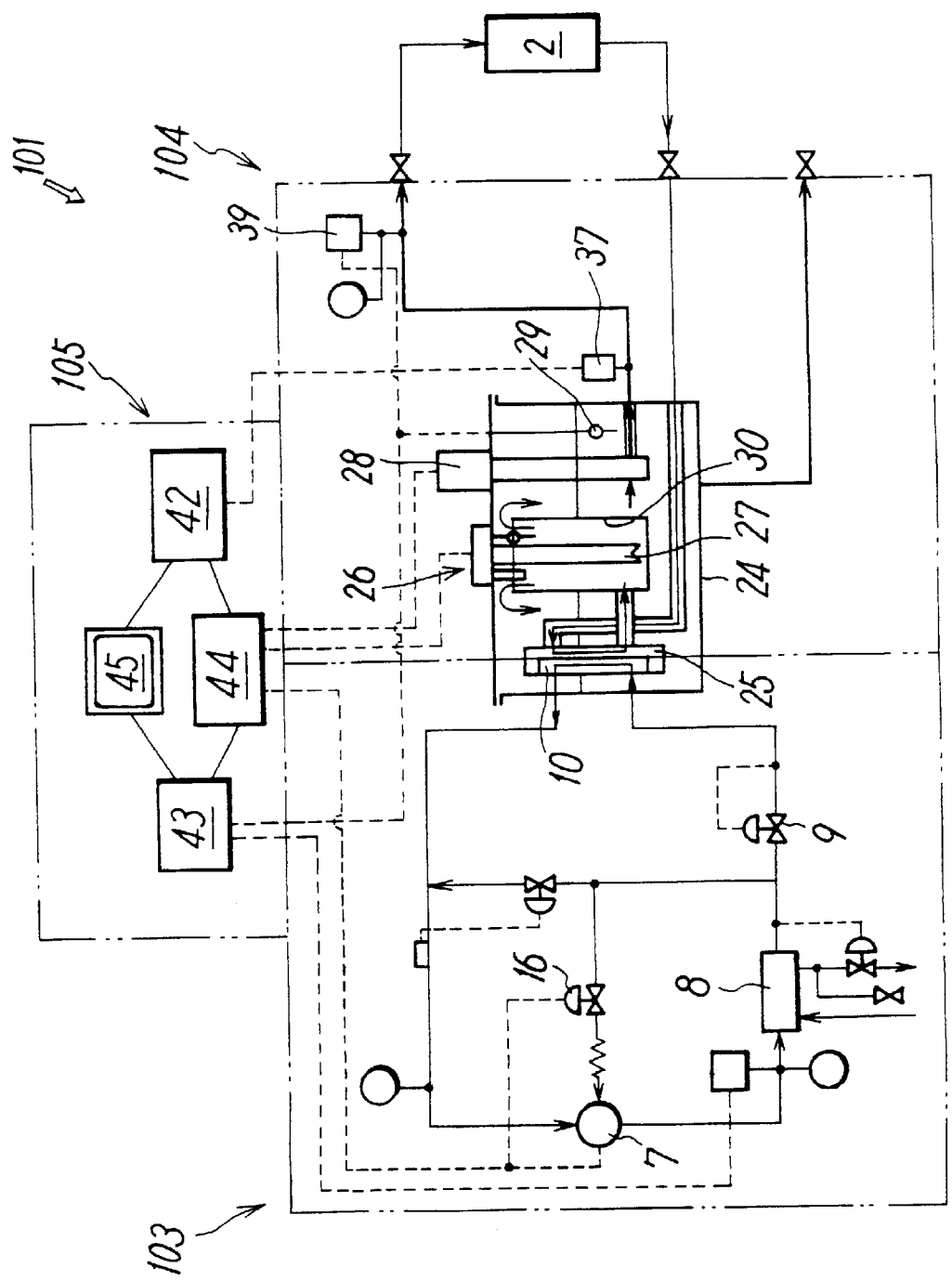
FIG. 3 is a configuration diagram of a constant-temperature liquid circulating apparatus which has been already proposed.
Figure 4:
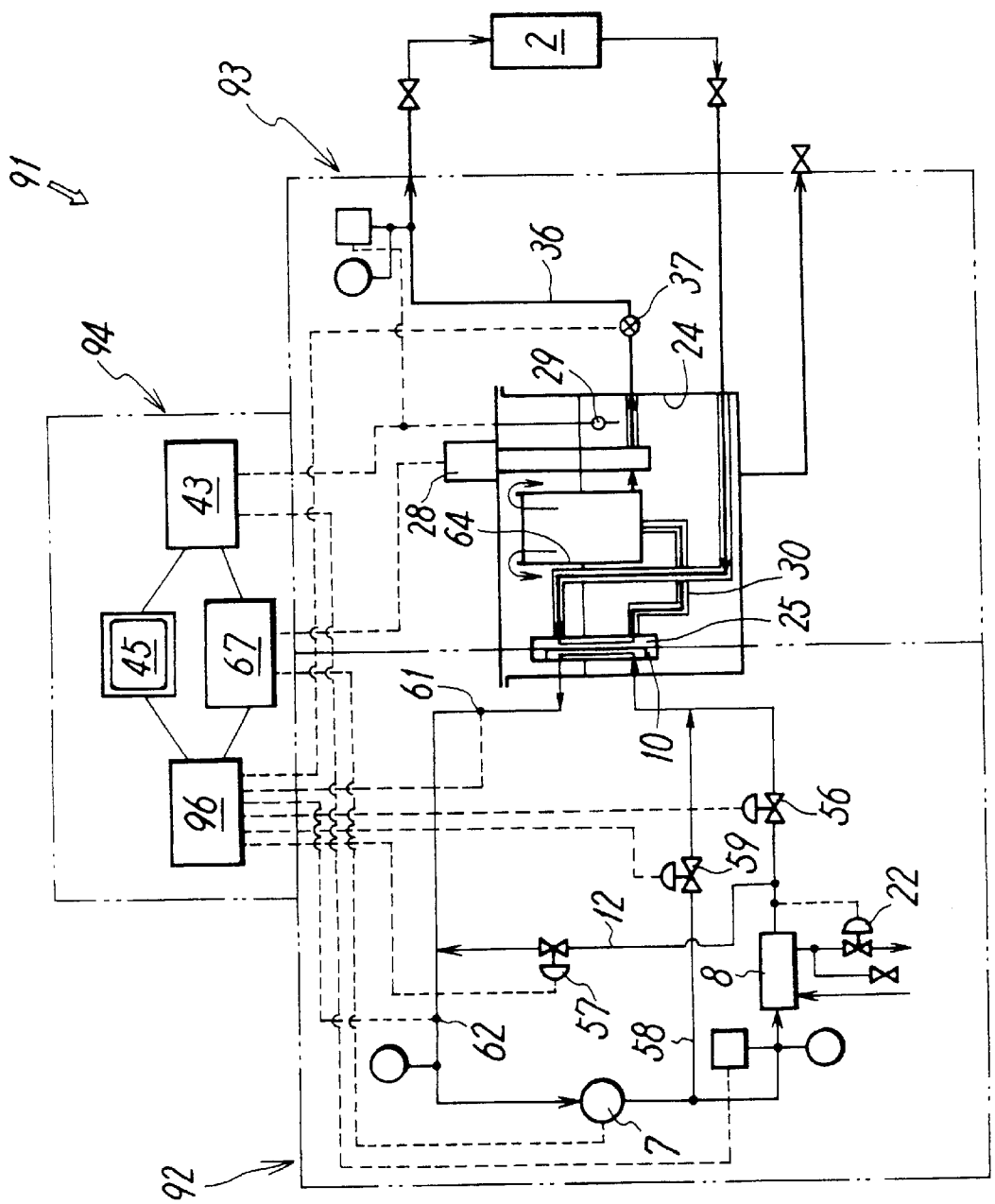
FIG. 4 is a configuration diagram of another apparatus which has been already proposed.

FIG. 2 shows another embodiment of a constant-temperature liquid circulating apparatus according to the present invention, which is structurally different from the apparatus shown in FIG. 1 in that the overflow tank 64 in the tank 24 is omitted in the constant-temperature liquid circuit section 4 so that the tank 24 is small-sized, and a temperature sensor 46 which detects the temperature of constant-temperature liquid is provided in the vicinity of the outflow side of the heat exchanger 25 and temperature sensors 47 and 60 which detect the temperature of the refrigerant gas are respectively provided on the inflow side and the outflow side of the evaporator 10, and which is similar to the apparatus shown in FIG. 1 regarding the other structures.

Then, the temperature sensors 37, 46, 47 and 60 output signals to the control section 5, and the control section 5 controls the opening degree of the electronic expansion valve 56 according to a deviation signal based upon a difference between the temperatures of the refrigerant gas which have been respectively detected by the temperature sensors 47 and 60 provided on the inflow side and the outflow side of the evaporator 10, it controls the revolution speed of the compressor 7 according to a signal from the temperature sensor 37 and it controls the opening degree of the electronic expansion valve 59 according to a signal from the temperature sensor 46.

Incidentally, the pressure sensor 48 and 61 can be used instead of the temperature sensors 47 and 60, and the opening degree of the electronic expansion valve 56 may be controlled using a deviation signal based upon a difference between the pressures of the refrigerant gas which have been respectively detected by the pressure sensors 48 and 61 provided on the inflow side and the outflow side of the evaporator 10 in place of the deviation signal based on the signals from the temperature sensors 47 and 60.

One example of control using the apparatus shown in FIG. 2 will be described.

(A) When the temperature of constant-temperature liquid which has been detected by the temperature sensor 37 or the temperature sensor 46 becomes higher than the target temperature (a set temperature) of the constant-temperature liquid, a difference between the temperatures of the refrigerant gas which have been respectively detected by the temperature sensors 47 and 60 or a difference between the pressures of the refrigerant gas which have been respectively detected by the pressure sensors 48 and 61 becomes large, so that the control section 5 controls the electronic expansion valve 56 in an opening direction according to a deviation signal based upon the signals from the temperature sensors 47 and 60 or a deviation signal based upon the signals from the pressure sensors 48 and 61.

Also, the control section 5 controls the electronic expansion valve 59 in a closing direction according to a signal from the temperature sensor 46 and performs control so as to increase the revolution speed of the compressor 7.

Then, these operations occur simultaneously and the temperature of the constant-temperature liquid cooled by the evaporator 10 approaches to the target temperature.

(B) When the temperature of constant-temperature liquid which has been detected by the temperature sensor 37 or the temperature sensor 46 becomes lower than the target temperature of the constant-temperature liquid, a difference between the temperatures of the refrigerant gas which have been respectively detected by the temperature sensors 47 and 60 or a difference between the pressures of the refrigerant gas which have been respectively detected by the pressure sensors 48 and 61 becomes small, so that the control section 5 controls the electronic expansion valve 56 in a closing direction according to a deviation signal based upon the signals from the temperature sensors 47, 60 or a deviation signal based upon signals from the pressure sensors 48 and 61.

Also, the control section 5 controls the electronic expansion valve 59 in an opening direction according to a signal from the temperature sensor 46 and performs control so as to reduce the revolution speed of the compressor 7.

Then, these operations occur simultaneously and the temperature of the constant-temperature liquid approaches to the target temperature.

(C) In case that the target temperature (the set temperature) of the constant-temperature liquid is considerably higher than the temperature of the constant-temperature liquid which has been detected by the temperature sensor 37 or the temperature sensor 46, the control section 5 performs control so as to close the electronic expansion valve 56, open the electronic expansion valve 59 and increase the revolution speed of the compressor 7 by determining that the set temperatures are higher than the temperatures which have been detected by the temperature sensors 37 and 46 by a preset reference values or more.

Accordingly, since supplying refrigerant to the evaporator 10 is stopped by closing the electronic expansion valve 56 and the hot gas of the compressor 7 is supplied to the evaporator 10 through the hot gas circuit portion 58, the constant-temperature liquid is heated by the evaporator 10 to approach to the target temperature rapidly.

When the temperature of the constant-temperature liquid approaches to the target temperature, the processing moves to control in the above-described (A) state.

In the embodiment shown in FIG. 2, since the opening degree of the electronic expansion valve 56 is controlled in accordance with the deviation signal from the temperature sensors 47 and 60 provided on the inflow side and the outflow side of the evaporator 10 or the deviation signal from the pressure sensor 48 and 61 provided on the inflow side and the outflow side of the evaporator 10, such an effect can be achieved that the control of the electronic expansion valve 56 in the refrigerating circuit section 3 can be simplified.

Also, since the opening degree of the electronic expansion valve 59 is controlled according to the signal from the temperature sensor 46 which has detected the temperature of the constant-temperature liquid in the vicinity of the outflow side of the heat exchanger 25 and the revolution speed of the compressor 7 is controlled according to the signal from the temperature sensor 37, the follow-up performance to fluctuation of a thermal load is further improved as compared with a case where the opening degree of the electronic expansion valve 59 and the revolution speed of the compressor 7 are controlled in accordance with only a signal from the temperature sensor 37.

The constant-temperature liquid circulating apparatus of the present invention is not always limited to the above embodiments. For example, in the embodiment shown in FIG. 2, two kinds of the temperature sensors 47 and 60 and the pressure sensors 48 and 61 which detect the temperatures and pressures of the refrigerant gas individually are provided on the inflow side and the outflow side of the evaporator 10 of the refrigerating circuit section 3, but only one kind of the temperature sensors 47 and 60 or the pressure sensors 48 and 61 may be provided, and the number of sensors, the position where a sensor is disposed, the kind of a sensor, an object to be controlled according to a signal from a sensor can be changed properly as needs.

In the constant-temperature liquid circulating apparatus 1 of the present invention, since the refrigerating capacity of the refrigerating circuit section 3 is controlled by controlling the revolution speed of the compressor 7 in addition to control effected by the electronic expansion valves 56 and 59, the temperature of the constant-temperature liquid supplied to the load 2 can be controlled to the predetermined temperature accurately and the time required for reaching the target temperature is remarkably accelerated, controllability to disturbance is excellent, a heater is not required for heating constant-temperature liquid, and energy saving can be achieved and the apparatus can be small-sized.

As described in detail, according to the present invention, there is provided a constant-temperature liquid circulating apparatus which can achieve energy saving, which can shorten the time required for reaching a target temperature, which has excellent controllability to disturbance, and which can be small-sized.

What is claimed is:

1. A constant-temperature liquid circulating apparatus comprising:

a constant-temperature liquid circuit section configured to cool or heat constant-temperature liquid returned back from a load to a predetermined temperature to supply the constant-temperature liquid to the load;

a refrigerating circuit section configured to cool or heat the constant-temperature liquid; and a control section, wherein the refrigerating circuit section includes a main circuit section having a compressor whose revolution speed is controlled by an inverter power source, a condenser, a first electronic expansion valve, an evaporator and piping connecting the compressor, the condenser, the first electronic expansion valve and the evaporator in series, and a hot gas circuit section that has a second electronic expansion valve that bypasses the condenser and the first electronic expansion valve to supply a portion of refrigerant with a high temperature discharged from the compressor to the evaporator, wherein the constant-temperature liquid circuit section includes a tank containing constant-temperature liquid, a heat exchanger that cools or heats the constant-temperature liquid returned back from the load in the evaporator, at least one constant-temperature liquid temperature sensor that detects the temperature of a constant-temperature liquid, and circulating means for supplying a constant-temperature liquid whose temperature has been adjusted to a predetermined temperature to the load to circulate the constant-temperature liquid, and wherein the control section controls opening degrees of the first and second electronic expansion valves and a revolution speed of the compressor according to a signal from the constant-temperature liquid temperature sensor to control a temperature of the constant-temperature liquid supplied to the load to a predetermined temperature.

2. A constant-temperature liquid circulating apparatus comprising:

a constant-temperature liquid circuit section configured to cool or heat a constant-temperature liquid returned back from a load to a predetermined temperature to supply the constant-temperature liquid to the load;

a refrigerating circuit section configured to cool or heat the constant-temperature liquid; and a control section, wherein the refrigerating circuit section includes a main circuit section having a compressor whose revolution speed is controlled by an inverter power source, a condenser, a first electronic expansion valve, an evaporator and piping connecting the compressor, the condenser, the first electronic expansion valve and the evaporator in series, a hot gas circuit section that has a second electronic expansion valve that bypasses the condenser and the first electronic expansion valve to supply a portion of refrigerant with a high temperature discharged from the compressor to the evaporator, and refrigerant temperature sensors or pressure sensors to detect a temperature or a pressure of the refrigerant, wherein the constant-temperature liquid circuit section includes a tank containing constant-temperature liquid, a heat exchanger that cools or heats the constant-temperature liquid returned back from the load in the evaporator, a constant-temperature liquid temperature sensor that detects the temperature of a constant-temperature liquid, and circulating means for supplying a constant-temperature liquid whose temperature has been adjusted to a predetermined temperature to the load to circulate the constant-temperature liquid; and wherein the control section controls opening degrees of the first and second electronic expansion valves and a revolution speed of the compressor according to at least one of a signal from the constant-temperature liquid temperature sensor and a signal from the refrigerant temperature sensor or a pressure sensor of the refrigerant circuit section to control the temperature of the constant-temperature liquid supplied to the load to a predetermined temperature.

3. A constant-temperature liquid circulating apparatus comprising:

a constant-temperature liquid circuit section configured to cool or heat a constant-temperature liquid returned back from a load to a predetermined temperature to supply the constant-temperature liquid to the load;

a refrigerating circuit section configured to cool or heat the constant-temperature liquid; and a control section, wherein the refrigerating circuit section includes a main circuit section having a compressor whose revolution speed is controlled by an inverter power source, a condenser, a first electronic expansion valve, an evaporator and piping connecting the compressor, the condenser, the first electronic expansion valve and the evaporator in series, a hot gas circuit section that has a second electronic expansion valve that bypasses the condenser and the first electronic expansion valve to supply a portion of refrigerant with a high temperature discharged from the compressor to the evaporator, and two refrigerant temperature sensors or two pressure sensors respectively provided at an inflow side and an outflow side of the evaporator of the main circuit section to detect a temperature or a pressure of a refrigerant, wherein the constant-temperature liquid circuit section includes a tank containing constant-temperature liquid, a heat exchanger that cools or heats the constant-temperature liquid returned back from the load in the evaporator, a first constant-temperature liquid temperature sensor and a second constant-temperature liquid temperature sensor to detect a temperature of the constant-temperature liquid, which detects the temperature of the constant-temperature liquid, and circulating means for supplying a constant-temperature liquid whose temperature has been adjusted to a predetermined temperature to the load to circulate the constant-temperature liquid, and wherein the control section controls opening degrees of the first electronic expansion valve according to the signal from the first and second refrigerant temperature sensors or the first and second pressure sensors provided at the inflow side and the outflow side of the evaporator, opening degrees of the second electronic expansion valve according to the signal from the second constant-temperature liquid temperature sensor, and a revolution speed of the compressor according to a signal from the first constant-temperature liquid temperature.

* * * * *